United States Patent [19]

Allen

[11] Patent Number: 5,345,304
[45] Date of Patent: Sep. 6, 1994

[54] INTEGRATED LADAR/FLIR SENSOR

[75] Inventor: John E. Allen, Lucas, Tex.

[73] Assignee: Texas Instruments Incorporated, Dallas, Tex.

[21] Appl. No.: 991,782

[22] Filed: Dec. 17, 1992

[51] Int. Cl.⁵ .......................... G01C 3/08; G01J 1/20; G01J 5/00
[52] U.S. Cl. ................................. 356/5; 250/203.2; 250/342; 356/141.1
[58] Field of Search ................ 250/342, 203.2; 356/5, 356/152; 358/113; 382/10

[56] References Cited

U.S. PATENT DOCUMENTS

| | | | |
|---|---|---|---|
| 3,698,812 | 10/1972 | Nelson | 356/5 |
| 3,953,667 | 4/1976 | Layton et al. | |
| 4,298,280 | 11/1981 | Harney | 356/5 |
| 4,424,943 | 1/1984 | Zwirn et al. | 244/3.11 |
| 4,497,065 | 1/1985 | Tisdale et al. | 356/4 |

*Primary Examiner*—Stephen C. Buczinski
*Attorney, Agent, or Firm*—Richard L. Donaldson; René E. Grossman

[57] ABSTRACT

A scene is observed with an object plane scanning FLIR (forward looking infrared) FLIR system with the detector array placed at one edge of the field of regard. A FLIR processor immediately commences analysis of the received FLIR signal for potential targets. Upon determination that a potential target exists, the FLIR processor causes the LADAR system to commence operation and directs the laser beam therefrom to the localized region where the potential target has been located. The system continues to receive the FLIR signals and causes these signal from the field of view to bypass the path of the reflected laser signals and pass directly to the FLIR detectors. The reflected laser signal returns through the optical system and is mixed with the beam from a local oscillator. The combined beam is then passed to the laser or LADAR detectors which operate in conjunction with a target classifier to classify the potential target being observed.

18 Claims, 3 Drawing Sheets

INTEGRATED LADAR/FLIR SENSOR

BACKGROUND OF THE INVENTION

1. FIELD OF THE INVENTION

This invention relates to a highly integrated LADAR/FLIR sensor for target acquisition for use on a missile at low altitudes or on aircraft.

2. BRIEF DESCRIPTION OF THE PRIOR ART

The laser radar (LADAR) and forward looking infrared (FLIR) sensors are complementary sensors in target acquisition systems. The FLIR images the infrared light emitted from a scene in an object plane and senses the image with an array of a hundred or more detectors. The image is then processed by a computer programmed with target detection algorithms to locate areas in the field of view that may contain targets. Targets, such as tanks or trucks, are generally warmer than the background due to the heat generated by the engine and to solar heating and therefore can be seen in a FLIR image. The FLIR image (sometimes called a "thermal image") of the target can vary greatly due to differences in solar heating from day to night and due to differences in engine loading.

A scanning FLIR sensor can quickly image large areas due to the large number of detectors in the array. Since targets have contrast with respect to the background, a FLIR can detect the presence of targets in the scene. However, the variability of the thermal image of a target makes it difficult to classify a target with respect to type (e.g. tank, truck or armored personnel carrier) with a target classification algorithm.

A laser radar (LADAR), on the other hand, creates a three dimensional image of a scene. A short pulse of laser light is transmitted to the scene and is reflected back to the LADAR which detects the return light. The duration of the interval in time between transmission and reception of the light is measured and related to range or distance to the scene. The LADAR is scanned over the scene and the range to each location in the scene is measured. In this manner, a three dimensional image of the scene is formed. A LADAR generally transmits a single beam and has a single detector to receive the return. Hence, a single LADAR cannot quickly image large areas as does a multiple detector FLIR. Therefore, a LADAR is not very useful in rapidly searching large scenes for potential targets. However, the three-dimensional target image created by the LADAR is stable in that it does not vary with engine loading or time of day. Hence, the three-dimensional image is useful for target classification in comparison with the thermal image.

The FLIR and the LADAR are complementary sensors in a target acquisition system. The FLIR creates a thermal image of a large scene, also known as a field of regard, quickly. A processor programmed with target detection algorithms processes the thermal image and locates potential targets. The LADAR is successively pointed to each of these potential targets, which is a small part of the field of regard, and creates a three-dimensional image of the potential target. A processor programmed with target classification algorithms processes the three-dimensional images and classifies the potential targets according to type. The classification algorithms can also declare the potential target not to be a target at all. This architecture makes use of the rapid imaging and target detection capabilities of the FLIR and the classification capabilities of the LADAR.

If the FLIR/LADAR sensor is to be small, light and rugged, the LADAR and FLIR hardware must be carefully integrated. A straightforward approach is depicted in FIG. 1. A FLIR and LADAR are mounted on a platform so that their optical axes are parallel. The optical axes of the two sensors are made to coincide with a beam combiner, such as a dichroic beam splitter. Here, the dichroic beam splitter transmits the passive infrared light forming the FLIR image and reflects the light from the LADAR. A head mirror is mounted in front of both the LADAR and FLIR and is capable of pointing either sensor in a selected direction. The head mirror is used to point the FLIR to the location in the object plane which is to be searched for targets. The thermal image of the scene is created and the processor detects the location of potential targets in the scene. The head mirror then points the LADAR toward the potential targets and a three-dimensional image is created. A processor programmed with target classification algorithms then processes the three-dimensional images to classify the potential targets.

SUMMARY OF THE INVENTION

The invention described hereinbelow is a combined FLIR and LADAR which, through the use of common components, achieves a high level of performance with a minimum weight, volume and power.

In accordance with the present invention, there is provided a highly integrated LADAR/FLIR sensor system which uses components common to each system and provides the target detection capabilities of the FLIR system and target classification capabilities of the LADAR system.

Briefly, a scene or field-of-regard is observed using an object plane scanned FLIR system with the detector array at one edge of the field of view. A FLIR processor immediately commences analysis of the received FLIR signal for potential targets. Upon determination that a potential target exists, the FLIR processor causes the LADAR system to commence operation and directs the laser beam therefrom to the localized region where the potential target has been located. The system continues to receive the FLIR signals and causes these signals from the edge of the field of view to bypass the path of the reflected laser signals and pass directly to the FLIR detectors. The reflected laser signal returns through the optical system and is mixed with the beam from a local oscillator. The conjoined beam is then passed to the laser or LADAR detectors which operate in conjunction with a target classifier to classify the potential target being observed.

DESCRIPTION OF THE PREFERRED EMBODIMENT

Figure 1:
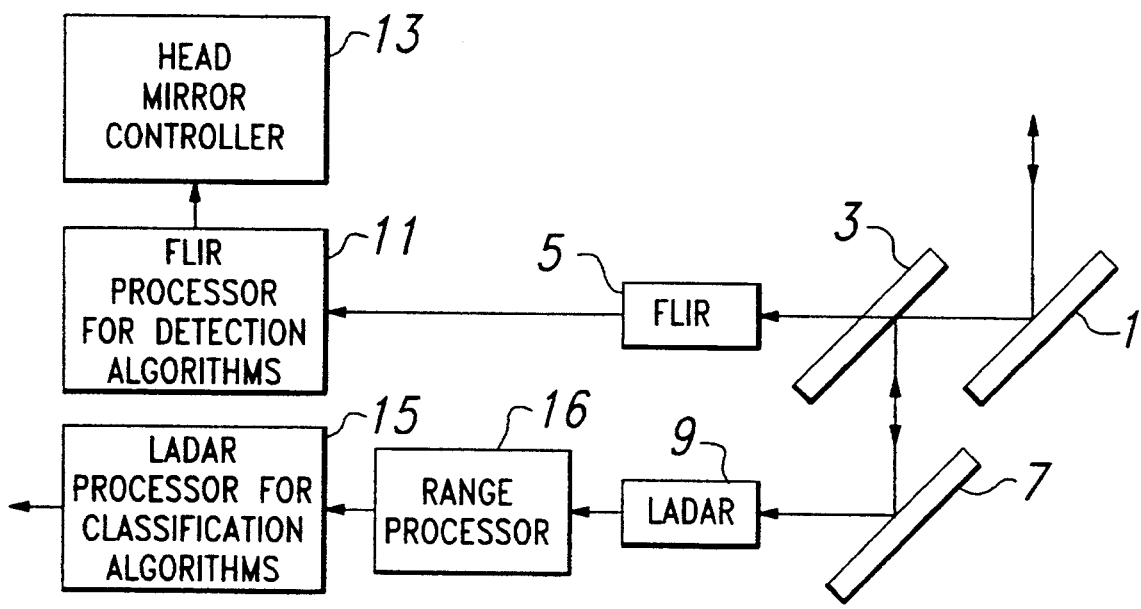
FIG. 1 is a block diagram of a typical prior art system combining LADAR and FLIR system.

Referring first to FIG. 1, there is shown a typical prior art system wherein the LADAR and FLIR systems are combined. Incoming energy from a distant scene or field of regard being observed is reflected by a scanning head mirror 1 onto a beam combiner which includes a first beam combiner 3 which transmits a portion of the energy therethrough to a FLIR system 5 and reflects the remainder of the energy to a mirror 7 from which the energy is reflected to a LADAR system 9. The FLIR system 5 passes its received signal to a FLIR processor 11 which contains detection algorithms for detecting the presence of targets and providing a signal in response thereto to a head mirror controller 13 to control the position of the head mirror 1. The LADAR system 9 passes its received signal to a range processor 16 which measures the round trip time of the laser pulse followed by a LADAR processor 15 which classifies the target being observed. The LADAR system 9 can also transmit an energy signal to a target via the mirror 7, the beam splitter or combiner 3 and the head mirror 1.

In operation, the FLIR processor 11 locates potential targets in the scanned scene and then, via the head mirror controller, controls the head mirror to point to one or more potential targets. The LADAR system 9 then transmits a pulse of light in standard manner via mirror 7 and beam combiner 3 and processes the returning signal in the target classifier 15 to determine the type of target located.

Figure 2A:
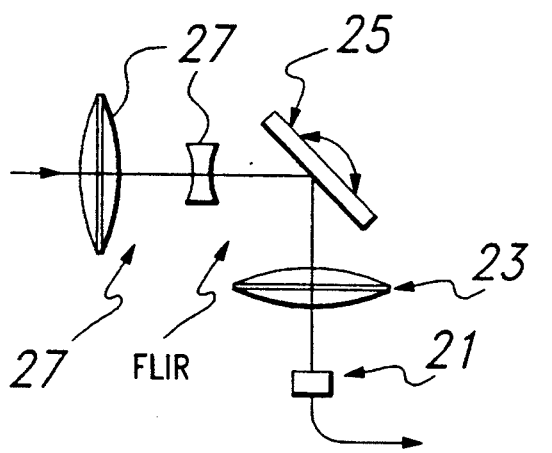
FIG. 2a is a schematic diagram of an image plane scanner.

With reference to FIGS. 2a, an image plane scanning FLIR is shown which includes an afocal lens system 27, a scan mirror 25, an imager lens 23 and a detector 21. This system can only scan through a small angle because, if the angle is too large, the scanning sector of the scan mirror 25 misses the afocal lens system 27 at extremes of the sector. The FLIR system is pointed to the target and the image is scanned by the detector array 21 with a scan mirror 25 via an afocal lens system 27 between the scene and the scan mirror and an imager lens 23 between the scan mirror and the detector array in a collimated region internal to the FLIR. As shown above, the field of view is limited since the image quality degrades at large angles with respect to the optical axes.

Figure 2B:
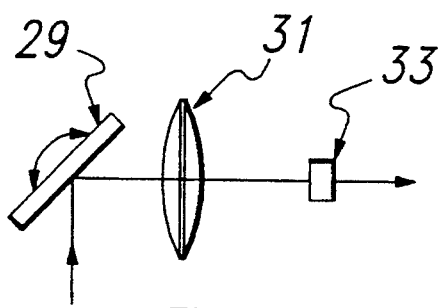
FIG. 2b is a schematic diagram of an object plane scanner.

An alternate system is an object plane scanning FLIR wherein the light from the scene goes directly to the scan mirror 29 and is then passed through an imager lens 31 to the detector 3 as shown in FIG. 2b. Since there is no lens system between the scan mirror and the scene, the scan mirror can traverse a very wide angle relative to the image plane scanner of FIG. 2a. The FIG. 2b arrangement is desirable because, with the FIG. 2a arrangement, one must scan a small image, then step over and scan another image, etc. whereas FIG. 2b scans the entire scene in one sweep.

Figure 2C:
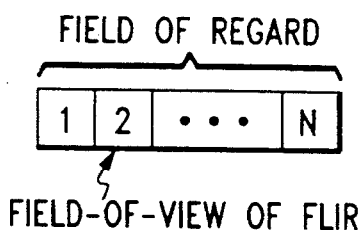
FIG. 2c is a schematic diagram showing coverage of a field-of-regard by an image plane scanning FLIR.

The manner in which an image plane scanning FLIR observes the field-of-regard is depicted in FIG. 2c. The field-of-regard is the portion of the object plane or scene which must be observed by the FLIR. The field-of-view of the FLIR is the portion of the field-of-regard which at any instant is in focus in the image plane of the FLIR. The image plane scanning FLIR is moved to location 1 in the field-of-regard. The FLIR is stabilized in this location and an image is collected. The field of view of the FLIR is then stepped to position 2 in the field-of-regard. The FLIR is again stabilized in this location and an image of the field-of-view at position 2 is collected. The field-of-view of the FLIR is successively moved across the field-of-regard in this step-stare manner until an image of the entire field-of-regard is formed. A great deal of time is spent in stepping and stabilizing the FLIR and therefore step-stare is an inefficient and time consuming means of imaging the field-of-regard.

Figure 2D:
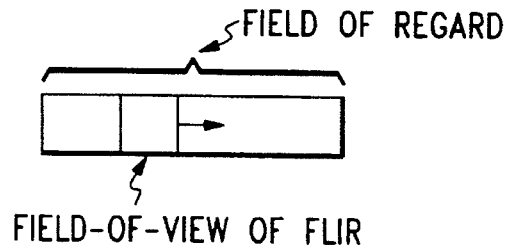
FIG. 2d is a schematic diagram showing coverage of a field-or-regard by an object plane scanning FLIR.

In contrast, the object plane scanning FLIR as shown in FIGURE 2d continually sweeps the field-of-view of the FLIR through the field-of regard and forms one long image of the entire field-of-regard. No stopping and staring is required. The speed and efficiency in which an object plane scanning FLIR forms an image of the field-of-regard makes it the logical choice in imaging or observing wide fields-of-regard.

Figure 3:
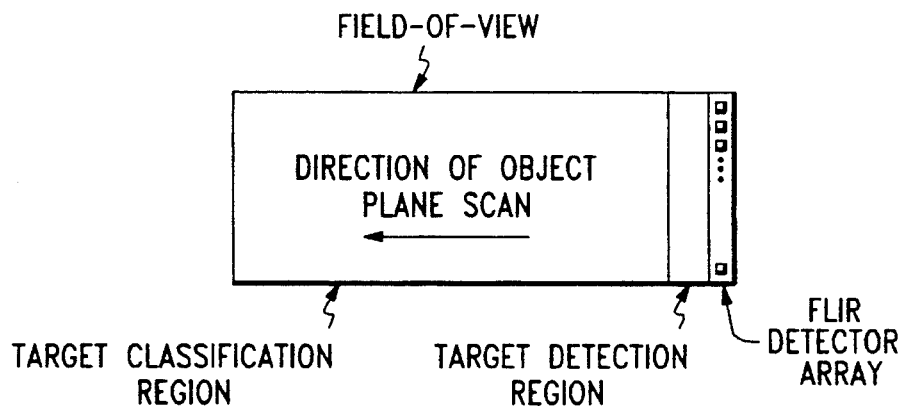
FIG. 3 is a diagram of the field of view of the object plane scan system in accordance with the present invention.

For a given position of the object plane scan mirror, the field of view in the image plane is depicted in FIG. 3. The FLIR detector array is placed at the edge of the field of view. As the object plane scan mirror moves the image at the edge of the field of view, the image is detected by the FLIR detectors. The detector outputs are immediately processed on-line by a FLIR processor programmed with target detection algorithms. Potential targets are detected and located during the time that the potential target image is in the target detection region. When the scan mirror has moved the image of the potential target into the target classification region, the LADAR is ready for operation. The laser beam of a LADAR system operating within the same optical system is then turned on and directed to the portion of the field of view containing the detected target as determined by the FLIR detection algorithms and the head mirror controller. The LADAR system then transmits pulses and receives reflections only from regions wherein a potential target has been located and generates a three dimensional image of the target. The three dimensional image is obtained before the target leaves the field of view. The target detection algorithms must be implemented quickly and the LADAR system must be pointed quickly before the target leaves the field of view. The LADAR system will transmit pulses to and then receive reflections only from regions wherein a potential target has been located. The target is assumed to be stationary though, even if it is moving, the movement is small relative to the scanning speed.

Figure 4:
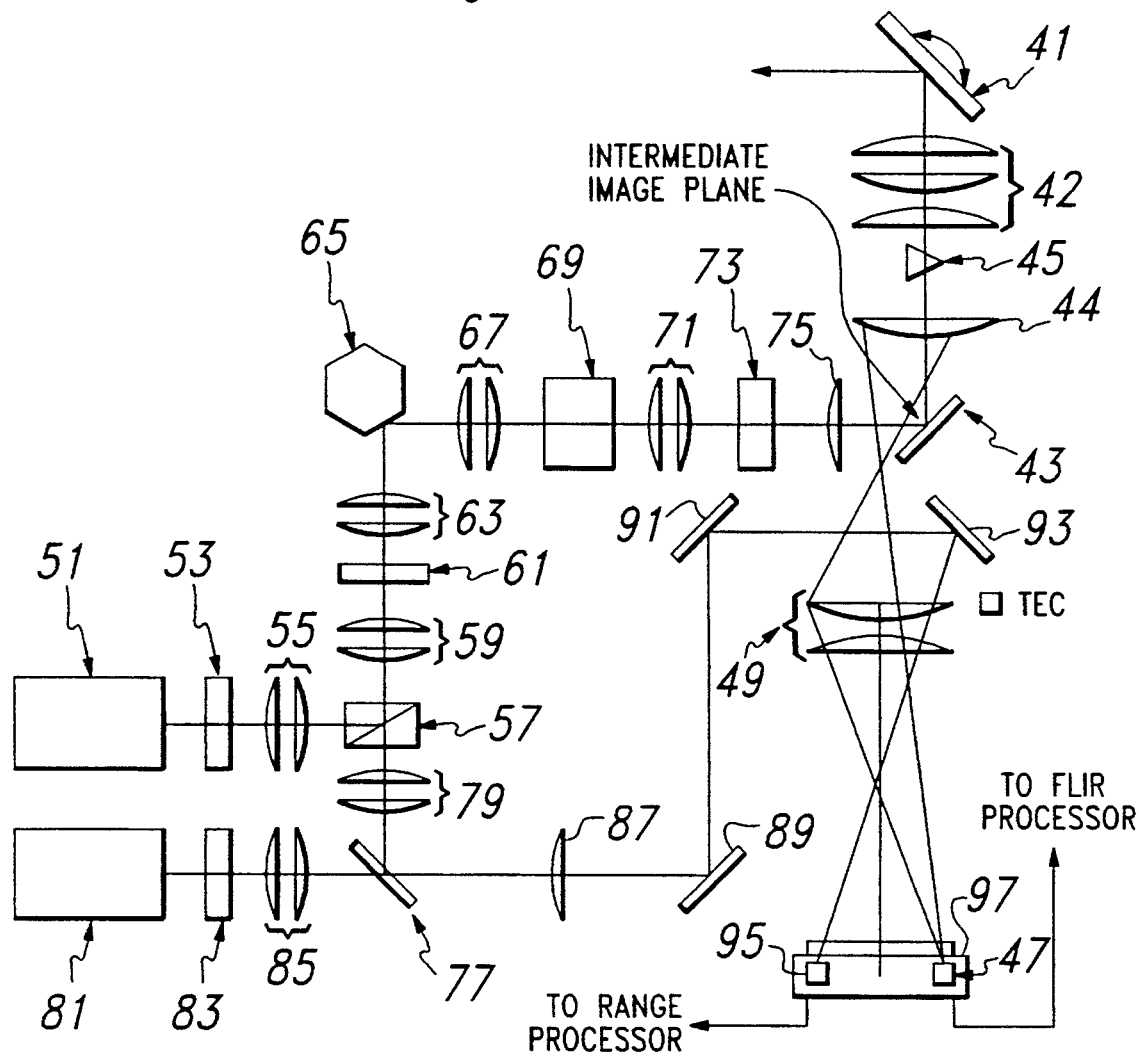
FIG. 4 is a schematic diagram of the integrated LADAR/FLIR system in accordance with the present invention.

A schematic implementation of the above described system is set forth in FIG. 4. Light from an object in the scene being observed is reflected by the scanning head mirror 41 and passes through optics 42, a rotational prism 45 and other optics 44 which are designed to provide an image in intermediate image plane at mirror 43. Since the FLIR system only receives light from the edge of the field-of-view as can be seen from FIG. 3, only light from the edge of the scene is permitted to go to the FLIR detectors 47 by going around (not striking) the mirror 43 via the lens system 49. The light which bypasses the mirror 43 corresponds to the portion of the field of view in FIG. 3 on which the FLIR detector array is shown. The rotational prism 45 rotates the image so that the scan direction is nominal to the FLIR detector array and compensates for image roll induced by aircraft motion.

The FLIR detectors operate as above described and, in conjunction with a FLIR processor for detection algorithms turn on the transmitter laser 51 when a possible target has been observed to provide a laser beam, such as a 10.6 micron beam from a carbon dioxide laser which passes through a phase grating 53. The phase grating 53 splits up the laser beam into three separate side by side beams and all of the beams are scanned simultaneously. This permits the system to operate three times as fast as if only one beam were being utilized. Operation with three beams may be desirable at short ranges when there is an excess of laser power. At longer ranges, the phase grating can be easily removed to provide a sufficient signal-to noise ratio in a single beam. The three beams now pass through optics 55, a polarization beam splitter 57 which acts as a mirror in this direction, optics 59, a quarter wave plate 61, further optics 63 and a rotating polygon scanner 65. The laser beams then pass through further optics 67, an azimuth scanner 69, further optics 71, an elevation scanner 73, further optics 75 and are then reflected by the mirror 43 through the above described elements back to the scene being observed and specifically to the potential target. The laser beam direction is controlled by the azimuth scanner 69 and the elevation scanner 73 which are both controlled by the FLIR processor.

The polarization beam splitter and quarter wave plate act as a duplexer which separates the transmitted beam from the return beam. The vertically polarized transmitted beam is reflected into the transmit optics. The quarter wave plate converts the transmitted vertically polarized light into circularly polarized light. The circularly polarized light strikes the target and reflects back to the LADAR and retraces the path of the transmitted light. When it passes through the quarter wave plate, the light becomes horizontally polarized and passes through the polarization beam splitter.

The return laser beam passes through the same elements, commencing with the head mirror 41, but in the opposite direction, until reaching the beam splitter 57 whereat the beam passes through the beam splitter to the beam combiner 77 via optics 79. Hence, the returning LADAR beam is split out from the passive infrared radiation without the use of spectral beam splitters (e.g., element 3 of FIG. 1). Since coated spectral beam splitters are not used, only a minimal amount of LADAR beam or passive infrared radiation is lost.

At the beam combiner 77, the laser beam is combined with a beam from a local oscillator 81 which passes through a phase grating 83 and optics 85, the combined signal then passing through optics 87 and a pair of mirrors 89 and 91 to mirror 93 which then directs the beam through lens system 49 to the laser detectors 95. The coatings on the beam combiner are chosen to transmit nearly 100% of the return beam and only a small fraction of the local oscillator beam.

The detectors create an electrical current in proportion to the time variation of the return laser beam. The current goes to a range processor which measures the time duration between the time of departure of the laser beam from the LADAR and the time of reception thereof by the LADAR. The time duration is then converted to range in the processor. The variation in range of the returns from each location in the object plane becomes the three-dimensional image of the object plane.

Figure 5A:
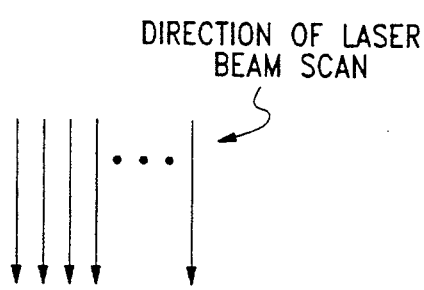
FIGS. 5a and 5b are diagrams of the LADAR system scan.
Figure 5B:
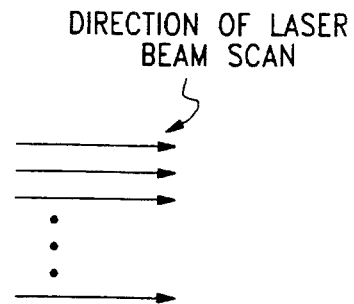
Figure 6:
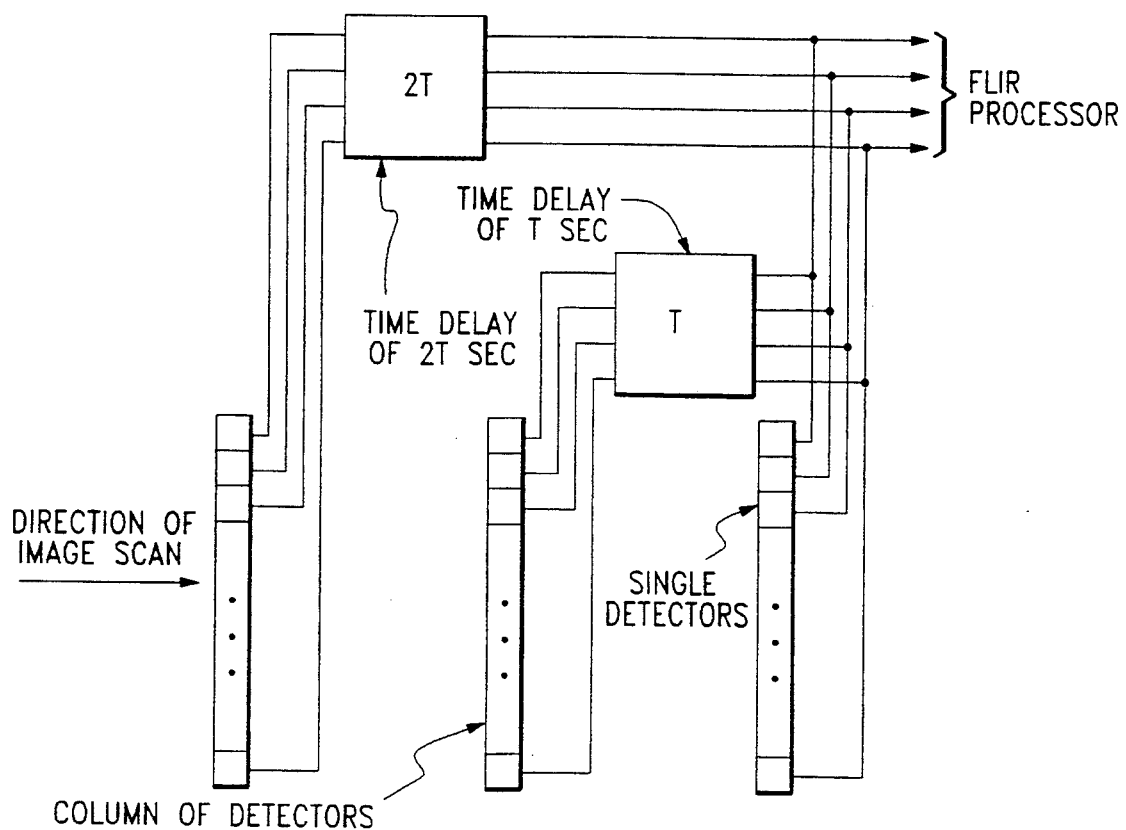
FIG. 6 is a schematic diagram of a time-delay-and-integrate (TDI) focal plane array.

The LADAR system scan is shown in more detail in FIGS. 5a and 5b. In FIG. 5a, the object plane scan moves the image in the horizontal direction. If the rotating polygon scanner 65 scans the beam in the vertical direction, the object plane scan provides the horizontal scan. If the object plane scan velocity is not the right velocity for a LADAR raster, the horizontal position scanner can augment the scan velocity so that the proper rate for a raster is achieved. Alternatively, the polygon scanner can scan the beam in the horizontal direction. The horizontal scan will then have to negate the object plane scan velocity to create a raster. The vertical positioning scanner will then step the beam down in the vertical direction. The beam exits the system and then returns. It is reflected off of the mirror 43 in the intermediate image plane and back to the quarter wave plate 61 where it become horizontally polarized and mixes with the local oscillator beam, at the beam combiner 77 which is an almost totally reflective glass plate. The mixed beams are then imaged into the LADAR detector 95. The LADAR detector or detectors and the FLIR detectors are placed in the same Dewar 97 to conserve weight, volume and power. The Dewar should be cold filtered to pass the 8 to 12 micron radiation for the FLIR system as well as the 10.6 micron radiation from the LADAR system. The local oscillator beam from oscillator 81 is made large enough to be the dominant noise in the LADAR detectors. The FLIR detectors 47 are a linear array which may or may not use TDI. TDI refers to the "time-delay-and-integrate" focal plane array. This type of array has two or more columns of detectors rather than a single column of detectors as shown in FIG. 6. As the image is scanned by the detectors as shown, the output of each column is delayed by successive time intervals of duration T so that the detector outputs which correspond to a particular location in the object plane are summed together. The time for the image to be scanned from one column to the next is T seconds. The FLIR detectors 47 should be shielded from reflections of the local oscillator 81 or transmitted LADAR beams.

As stated above, at short ranges, when excess power may be present, the LADAR beams can be split into multiple beams with phase gratings 53. The phase grating can split the LADAR beam conveniently into 3 or 9 beams. The phase grating 53 in the transmitter beam splits the transmitted beam and the phase grating 83 in the local oscillator beam creates the multiple local oscillator beams. The single LADAR detector can be replaced on array detectors matched to the multiple laser beams. The phase gratings can be moved quickly in and out.

In practice, the speed of the object plane scan can be variable. Over areas which contain many targets, the object plane scan speed will be small so that many three dimensional images can be obtained. Over areas which contain few targets, the object plane scan speed is large since only a few three dimensional images will be required.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

I claim:

1. A method of locating a target using a LADAR/FLIR system comprising the steps of:
   (a) providing a FLIR system and a LADAR system;
   (b) commencing continuous scanning of a field of view through a field of regard using said FLIR system with the detector array of said FLIR system placed at one edge of said field of regard to provide outputs from said detector array indicative of the field of view scanned;
   (c) analyzing the outputs of said detector array indicative of said field of view scanned for potential targets meeting predetermined criteria;
   (d) commencing operation of and providing direction of a laser beam from a LADAR system to a detected potential target in said field of view in response to detection of a potential target from said field of regard and during said scanning of said field of regard by said FLIR system; and
   (e) analyzing the reflections of said laser beam to classify the potential target.

2. The method of claim 1 wherein said step of analyzing comprises providing a FLIR processor programmed with target detection algorithms and operating in conjunction with said target detection algorithms on the FLIR image to locate potential targets.

3. The method of claim 1 further including the step of providing a LADAR processor programmed with target classification algorithms and operating in conjunction with said target classification algorithms on signals from the return LADAR to classify said potential target.

4. The method of claim 2 further including the step of providing a LADAR processor programmed with target classification algorithms and processing the reflections of said laser beam in conjunction with the target classification algorithms of said LADAR processor to classify said potential target.

5. A method of locating a target using a LADAR/FLIR system comprising the steps of:
   (a) providing a FLIR system and a LADAR system;
   (b) commencing continuous scanning a field-of-view over a field of regard using said FLIR system with the detector array of said FLIR system placed at one edge of said field of regard to provide outputs from said detector array indicative of the field of view scanned;
   (c) analyzing the outputs of said detector array indicative of said field of view scanned during said scan of said field of regard for potential targets meeting predetermined criteria;
   (d) commencing operation of and providing direction to a laser beam from a LADAR system to a detected potential target in said field of view responsive to detection of said potential target from the scanned field of view and during said scanning of said field of regard; and
   (e) analyzing the reflections of said laser beam to classify the potential target.

6. The method of claim 5 wherein said step of analyzing comprises providing a processor programmed with algorithms to process data received from said field of regard and processing said data received from said field of regard to locate potential targets.

7. The method of claim 5 further including the step of providing a processor programmed with algorithms to process the reflections of said laser beam and processing said reflections in conjunctions with said algorithms to classify said potential target.

8. The method of claim 6 further including the step of providing a processor programmed with target classification algorithms and processing said reflections in conjunction with said target classification algorithms to classify said potential target.

9. The method of claim 5 wherein the detector array of said FLIR system is placed at the edge of the field of view to detect the infrared image immediately after it enters the field of view.

10. The method of claim 6 wherein the detector array of said FLIR system is placed at the edge of the field of view to detect the infrared image immediately after it enters the field of view.

11. The method of claim 7 wherein the detector array of said FLIR system is placed at the edge of the field of view to detect the infrared image immediately after it enters the field of view.

12. The method of claim 8 wherein the detector array of said FLIR system is placed at the edge of the field of view to detect the infrared image immediately after it enters the field of view.

13. A method of locating a target using a LADAR/FLIR system comprising the steps of:
   (a) providing a first reflecting surface for reflecting energy;
   (b) providing an energy path containing FLIR and transmitted and reflected laser energy;
   (c) reflecting both a portion of said FLIR and substantially all of said laser energy off of said reflecting surface;
   (d) causing a portion of said FLIR energy to circumvent said reflecting surface;
   (e) detecting said FLIR energy circumventing said reflecting surface; and
   (f) commencing transmission and direction to said potential target of said transmitted laser energy responsive to said FLIR energy defining and locating a potential target.

14. The method of claim 13 further including detecting said reflected laser energy reflected from said potential target and classifying said detected reflected energy.

15. The method of claim 14 further including the step of providing a source for combining passive infrared energy and energy from said laser.

16. The method of claim 1, wherein said reflections provide a three dimensional image of said potential target.

17. The method of claim 5, wherein said reflections provide a three dimensional image of said potential target.

18. The method of claim 13 wherein said reflections provide a three dimensional image of said potential target.

* * * * *

UNITED STATES PATENT AND TRADEMARK OFFICE
CERTIFICATE OF CORRECTION

PATENT NO. : 5,345,304
DATED : September 6, 1994
INVENTOR(S) : John B. Allen

It is certified that error appears in the above-indentified patent and that said Letters Patent is hereby corrected as shown below:

On the title page, item [75], "E" should read --B--.

Signed and Sealed this

Fifteenth Day of November, 1994

Attest:

BRUCE LEHMAN

Attesting Officer

Commissioner of Patents and Trademarks